Jan. 20, 1970      J. E. DANDL      3,490,817
PENDULUM MOUNTED BEARING
Filed Aug. 19, 1968
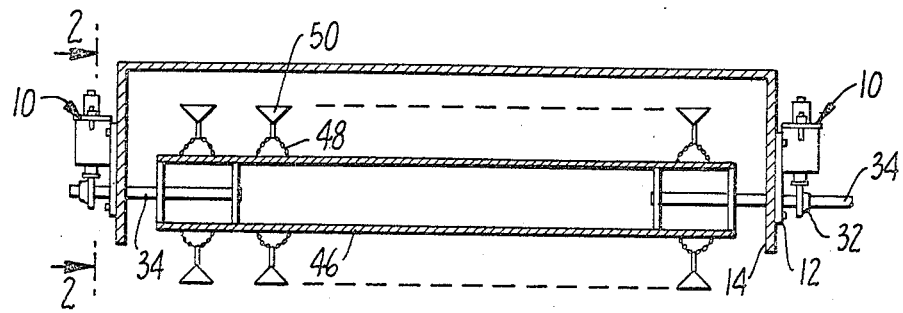
FIG. 1.
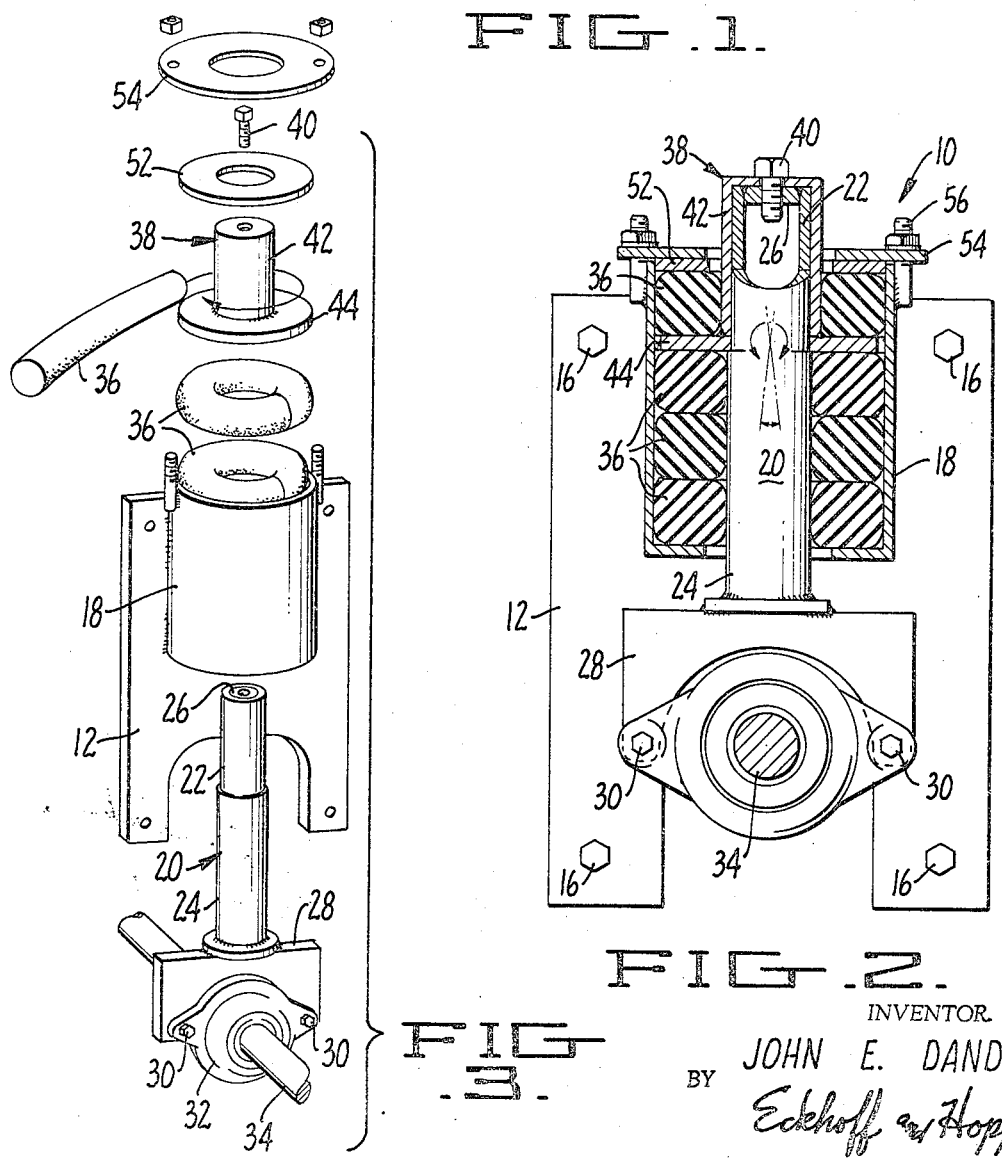
FIG. 2.
FIG. 3.
INVENTOR.
JOHN E. DANDL
BY Eckhoff and Hoppe
ATTORNEYS

United States Patent Office 3,490,817
Patented Jan. 20, 1970

3,490,817
PENDULUM MOUNTED BEARING
John E. Dandl, Orland, Calif.
(P.O. Box 687, Chico, Calif. 95926)
Filed Aug. 19, 1968, Ser. No. 753,385
Int. Cl. F16c 27/02
U.S. Cl. 308—26                                      5 Claims

ABSTRACT OF THE DISCLOSURE

A pendulum mounted bearing structure is provided with a bearing carrier member and a mounting plate having a housing barrel therein. A pendulum member extends through the housing barrel and is connected to the bearing carrier member at one end and is attached for pendulum movement on the other end to a flange member. Shock absorbing members within the housing barrel limit the movement of the pendulum member.

BACKGROUND OF THE INVENTION

Field of the invention

A pendulum mounted bearing structure is provided with a pendulum member which extends through a housing barrel. Shock absorbing members within the housing barrel support a flange member attached to the end of the pendulum member as well as limit the movement of the pendulum member.

Description of the prior art

A search was made on the structure of this invention prior to the filing of the application. The search did not reveal any patents which utilized a pendulum bearing member and a housing barrel circling the greater portion of a pendulum member with shock absorbing means to limit the movement of the pendulum member laterally and longitudinally.

SUMMARY OF THE INVENTION

Certain machinery and in particular, farm machinery make use of high speed rotational shafts which support reel like members which in turn extend to distances of 8 to 10 and even 15 feet. Examples of such usage are found in farm mowers, beet cutters, rice choppers, and the like. All of these pieces of equipment require that a shaft rotate at over 2000 r.p.m. to bring about effective cutting by the knives which are attached to the reel member. In such operations the supports for the shaft must bear the weight of the shaft as well as allow the shaft some freedom to change its center of rotation so that the shaft can become a truly self-balancing member. Such a truly self-balancing member eliminates torsional vibrations and the out of balance effect caused by the shaft or reel losing a knife or picking up of a foreign object.

One major problem encountered in the above described equipment is that with the various types of mountings employed at the present time, the shafts cannot maintain their own rotational center of graviy. Thus, once a high speed rotational shaft gets out of alignment it continues in such position and gradually becomes further out of line until the vibrations render the machine inoperative.

Applicant has overcome the above described problem by providing a combined self-balancing and shock absorbing structure which allows the shaft to seek its own rotational center of gravity.

It is the primary object of the present invention to provide a new and improved combined self-balancing and shock absorbing structure.

Another object is to provide a combined self-balancing and shock absorbing structure which can be adjusted to regulate the amount of tension on the pendulum structure.

A further object of the invention is to provide structure of the character described which is economical to produce and long lasting in usage.

BRIEF DESCRIPTION OF THE DRAWING

FIGURE 1 is a side view partially in section illustrating a structure embodying the features of the present invention.

FIGURE 2 is a view taken substantially as indicated along line 2—2 of FIGURE 1.

FIGURE 3 is a fragmentary perspective view illustrating the component parts of the present invention.

DESCRIPTION OF THE PREFERRED EMBODIMENT

Referring to FIGURE 1 of the drawing, there is shown the pendulum mounted bearing of this invention, generally indicated 10, which is adaptable for use on many implements where high shaft speeds are encountered, such as on rice cutters, flail mowers and the like.

Looking particularly at FIGURES 2 and 3 there is shown a mounting plate 12 which is secured to side plate 14 of a cutter or mower by bolts 16. The mounting plate 12 has a circular housing barrel 18 therein which runs about half the vertical distance of the plate.

Extending through the housing barrel 18 is a pendulum member 20 with the upper portion 22 thereof having a slightly reduced outer diameter as compared to the lower portion 24. The top of the pendulum member 20 has a threaded supporting nut 26 and the bottom of the pendulum member 20 is connected by welding or the like to bearing carrier member 28.

Attached to bearing carrier member 28 by bolts 30 is a standard two hole flange bearing 32 within which is journaled shaft 34. Shock absorbing members 36 are inserted into the housing barrel 18 and completely encircle the pendulum member 20. A flange member 38 fits within the housing barrel 18 and utilizes main support bolt 40 to threadably connect with supporting nut 26 to provide the sole source of support for the pendulum member 20. The tubular portion 42 of the flange member 38 provides a close fit for the upper portion 22 of the pendulum member and serves as a guide to movement. The flange portion 44 of the flange member 38 rests on some of the shock absorbing members 36 and has about ¼" diameter clearance with the housing barrel 18.

Thus it can be seen that flange member 38 and one shock absorbing member 36 limit the lateral movement of the upper portion 22 of pendulum member 20 and the remaining shock absorbing members 36 limit the lateral movement of the lower portion 24 of the pendulum member 20. The lower shock absorbing members 36 also limit the downward movement of the pendulum member 20 because flange portion 44 of the flange member 38 is supported by the shock absorbing members 36. The various movements of the pendulum member 20 are illustrated by the arrows and angles of FIGURE 2.

A typical installation for the pendulum mounted bearing 10 of the present invention is shown in FIGURE 1 wherein the shafts 34 support a reel tube 46. A chain 48 connects knife member 50 to the reel 46. Rotation of the shafts 34 by conventional belt or chain drives in turn rotates the reel tube 46 thereby imparting a centrifugal cutting force to the knives members 50.

The shock absorbing members 36 are within the housing barrel 18 tend to contract upon usage. To adjust the pressure applied to the shock absorbing members and thereby also the tension on the pendulum structure, a washer member 52 can be inserted into the housing barrel 18. Barrel cover 54 is secured to the top of the housing barrel 18 by bolts 56 and maintains in place all the component parts therein. The barrel cover 54 and washer member 52 have about ⅜" clearance with the tubular portion 42 of flange member 38 to allow the flange member 38 adequate movement so that the bearing 32 can be self-balancing.

Rubber of 60 duro hardness has been found satisfactory in operation for the shock absorbing members 36 but rubber of other hardness can be used depending upon the severity of the application. In addition, the arrangement shown in FIGURE 2 has proven satisfactory, in operation namely, a 1 to 3 ratio with one shock absorbing member 36 above and three shock absorbing members 36 below the flange portion 44 of the flange member 38. However, other numbers and ratios of the shock absorbing members 36 can be used to achieve the desired effect of a self-balancing bearing.

I claim:
1. A pendulum mounted bearing comprising:
   a bearing attached to a bearing carrier member;
   a mounting plate having a housing barrel therein;
   a pendulum member extending through said housing barrel and secured at one end to said bearing carrier member;
   a plurality of shock absorbing members within said housing barrel encircling said pendulum member;
   and a flange member resting on a portion of said shock absorbing members within said housing barrel and fastened to the other end of said pendulum member.

2. The pendulum mounted bearing of claim 1 wherein the flange member rests on a majority of the shock absorbing members within the housing barrel.

3. The pendulum mounted bearing of claim 2 wherein four shock absorbing members are within the housing barrel and the flange member rests on three of the shock absorbing members.

4. The pendulum mounted bearing of claim 1 wherein means are provided within the housing barrel to adjust the pressure applied to the shock absorbing members.

5. The pendulum mounted bearing of claim 1 wherein the pendulum member has an upper portion of reduced outer diameter upon which the flange member encircles.

References Cited

UNITED STATES PATENTS 1,162,125  11/1915  Bossett _____ 308—26

MARTIN P. SCHWADRON, Primary Examiner

F. SUSKO, Assistant Examiner